(12) United States Patent
Whitbeck et al.

(10) Patent No.: US 8,726,874 B2
(45) Date of Patent: May 20, 2014

(54) CYLINDER BORE WITH SELECTIVE SURFACE TREATMENT AND METHOD OF MAKING THE SAME

(75) Inventors: Rodney G. Whitbeck, Northville, MI (US); David Alan Stephenson, Detroit, MI (US); Keith Raymond Bartle, Sterling Heights, MI (US); David Garrett Coffman, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/461,160

(22) Filed: May 1, 2012

(65) Prior Publication Data

US 2013/0291823 A1 Nov. 7, 2013

(51) Int. Cl.
*F02F 3/00* (2006.01)
*F02F 1/10* (2006.01)
*F02F 11/00* (2006.01)
*F02F 1/42* (2006.01)

(52) U.S. Cl.
USPC .................. 123/193.1; 123/193.2; 123/193.3; 123/193.4; 123/193.5

(58) Field of Classification Search
USPC ....................................... 123/193.1, 2, 3, 4, 5
See application file for complete search history.

(56) References Cited

U.S. PATENT DOCUMENTS

| | | | |
|---|---|---|---|
| 3,031,330 A | 4/1962 | Hornick | |
| 3,324,496 A | 6/1967 | Haracz | |
| 4,324,017 A | 4/1982 | Viehe | |
| 4,646,479 A | 3/1987 | Walker et al. | |
| 5,107,967 A * | 4/1992 | Fujita et al. | 188/72.1 |
| 5,239,955 A | 8/1993 | Rao et al. | |
| 5,332,422 A | 7/1994 | Rao | |
| 5,363,821 A | 11/1994 | Rao et al. | |
| 5,380,564 A | 1/1995 | VanKuiken, Jr. et al. | |
| 5,480,497 A | 1/1996 | Zaluzec et al. | |
| 5,481,084 A | 1/1996 | Patrick et al. | |
| 5,622,753 A | 4/1997 | Shepley et al. | |
| 5,648,122 A | 7/1997 | Rao et al. | |
| 5,691,004 A | 11/1997 | Palazzolo et al. | |
| 5,820,938 A | 10/1998 | Pank et al. | |

(Continued)

FOREIGN PATENT DOCUMENTS

| | | |
|---|---|---|
| DE | 19919024 A1 | 11/2000 |
| DE | 60131096 T2 | 2/2008 |

(Continued)

OTHER PUBLICATIONS

International Patent Bureau, International Search Report for the corresponding German Patent Application No. DE 10 2008 019 933.8 filed Apr. 21, 2008 and the PCT/EP2009/054670 filed Apr. 20, 2009.

(Continued)

*Primary Examiner* — Lindsay Low
*Assistant Examiner* — Charles Brauch
(74) *Attorney, Agent, or Firm* — Damian Porcari; Brooks Kushman P.C.

(57) ABSTRACT

A cylinder bore with selective surface treatment includes a longitudinal axis and a cylindrical wall extending along the longitudinal axis, the cylindrical wall including first and second end portions and a middle portion positioned between the first and second end portions, the middle portion having a greater surface roughness than at least one of the first and second end portions.

14 Claims, 9 Drawing Sheets

(56) References Cited

U.S. PATENT DOCUMENTS

| | | | |
|---|---|---|---|
| 5,931,038 A * | 8/1999 | Higashi | 72/70 |
| 5,958,521 A * | 9/1999 | Zaluzec et al. | 427/449 |
| 5,997,286 A | 12/1999 | Hemsath et al. | |
| 6,328,026 B1 * | 12/2001 | Wang et al. | 123/668 |
| 6,395,090 B1 | 5/2002 | Shepley et al. | |
| 6,589,605 B2 | 7/2003 | Shepley et al. | |
| 6,622,685 B2 | 9/2003 | Takahashi et al. | |
| 6,863,931 B2 | 3/2005 | Someno et al. | |
| 7,089,662 B2 | 8/2006 | Izquierdo et al. | |
| 7,165,430 B2 * | 1/2007 | Weidmer | 72/102 |
| 7,188,416 B1 * | 3/2007 | Woehlke et al. | 29/888.011 |
| 7,415,958 B2 * | 8/2008 | Boehm et al. | 123/193.2 |
| 7,568,273 B2 | 8/2009 | Iizumi et al. | |
| 7,607,209 B2 | 10/2009 | Iizumi et al. | |
| 7,851,046 B2 * | 12/2010 | Nishimura et al. | 428/141 |
| 7,862,404 B2 * | 1/2011 | Takashima et al. | 451/51 |
| 8,209,831 B2 | 7/2012 | Boehm et al. | |
| 2004/0079556 A1 * | 4/2004 | Cramer et al. | 175/415 |
| 2005/0064146 A1 | 3/2005 | Hollis et al. | |
| 2007/0012177 A1 | 1/2007 | Miyamoto et al. | |
| 2008/0252412 A1 | 10/2008 | Larsson et al. | |
| 2008/0260958 A1 | 10/2008 | Sekikawa et al. | |
| 2009/0175571 A1 | 7/2009 | Boehm et al. | |
| 2010/0031799 A1 | 2/2010 | Ast et al. | |
| 2010/0101526 A1 | 4/2010 | Schaefer et al. | |
| 2010/0139607 A1 | 6/2010 | Herbst-Dederichs et al. | |
| 2011/0000085 A1 | 1/2011 | Kanai et al. | |
| 2011/0023777 A1 * | 2/2011 | Nishimura et al. | 118/663 |
| 2011/0297118 A1 * | 12/2011 | Izawa et al. | 123/193.5 |
| 2012/0018407 A1 | 1/2012 | Schramm et al. | |

FOREIGN PATENT DOCUMENTS

| | | |
|---|---|---|
| DE | 102006045275 B3 | 2/2008 |
| DE | 102008022225 A1 | 11/2009 |
| DE | 102008024313 A1 | 12/2009 |
| DE | 102008058452 A1 | 2/2010 |
| DE | 102009008741 A1 | 8/2010 |
| EP | 0903422 A1 | 3/1999 |
| EP | 0919715 A2 | 6/1999 |
| EP | 0816527 B1 | 7/2000 |
| EP | 1559807 A1 | 1/2005 |
| EP | 1504833 A1 | 2/2005 |
| EP | 1854903 A1 | 11/2007 |
| JP | 1-246352 A | 10/1989 |
| JP | 08111582 A | 4/1996 |
| JP | 2005336556 A | 12/2005 |
| JP | 2006097045 A | 4/2006 |
| JP | 2006097046 A | 4/2006 |
| JP | 2007277607 A | 10/2007 |
| RU | 2297314 C2 | 4/2007 |
| SU | 1310181 A1 | 5/1987 |
| WO | 0033789 A1 | 6/2000 |
| WO | 2005040446 A1 | 6/2005 |
| WO | 2005273425 A1 | 8/2005 |
| WO | 2006161710 A1 | 6/2006 |
| WO | 2007007821 A1 | 1/2007 |
| WO | 2007087989 A1 | 8/2007 |
| WO | 2008034419 A1 | 3/2008 |
| WO | 2011161346 A1 | 12/2011 |

OTHER PUBLICATIONS

European Patent Office, European Search Report for the corresponding EP Application No. 10167055.2 mailed Oct. 11, 2011.

C. Verpoort, W. Blume, R. Ehrenpreis, Ford Motor Company, ICES2006-1391, Proceedings of ICES2006, Thermal Spraying of Aluminum Cylinder Bores by the Ford PTWA Spray Process, 2006 Internal Combustion Engine Division Spring Technical Conference, May 7-10, 2006, Aachen, Germany.

Eberhard Kretzschmar, The Metal Spraying Process and its Application in our history, Veb Carl Marhold Publishing House, Halle (Saale), 1953.

* cited by examiner

US 8,726,874 B2

CYLINDER BORE WITH SELECTIVE SURFACE TREATMENT AND METHOD OF MAKING THE SAME

TECHNICAL FIELD

The present invention relates to cylinder bore with selective surface treatment and method of making the same.

BACKGROUND

Internal cylindrical surfaces of the engine bores where an engine piston travels are treated to provide surface roughness to facilitate bonding to a later applied metallic coating. Various surface roughening techniques have been used in the art, but have been met with limitations.

SUMMARY

In one aspect, a cylinder bore with selective surface treatment is provided. In one embodiment, a cylinder bore includes a longitudinal axis and a cylindrical wall extending along the longitudinal axis, the cylindrical wall including first and second end portions and a middle portion positioned between the first and second end portions, the middle portion having a greater surface roughness than at least one of the first and second end portions.

In another embodiment, the middle portion has a greater surface roughness than the first and second end portions.

In yet another embodiment, the first and second end portions have first and second end portion diameters, respectively, the middle portion has a middle portion diameter, and at least one of the first and second end portion diameters is smaller than the middle portion diameter. The first and second end portion diameters may each smaller than the middle portion diameter.

In yet another embodiment, an axial length ratio of the middle portion and one of the first and second end portions is of 10:1 to 50:1. The first end portion may have a different axial length relative to the second end portion. In certain instances, at least one of the first and second end portions has an axial length that is 2 to 15 percent of a length of the middle cylindrical portion. In certain other instances, at least one of the first and second end portions has an axial length that is 15 to 25 percent of an axial length of the middle portion.

According to another aspect, a method of forming the cylinder bore with selective surface treatment is provided. The method includes increasing roughness of the middle portion to form a roughened middle portion such that the roughened middle portion has a greater surface roughness than at least one of the first and second end portions. The roughened middle portion includes a number of teeth and grooves, each of the teeth including a rectangular cross-section. In certain instances, the tops of the teeth may be formed to increase adhesion. This step may be performed with a tool having a wiper insert or with roller burnishing or knurling tool.

DETAILED DESCRIPTION

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Figure 2A:
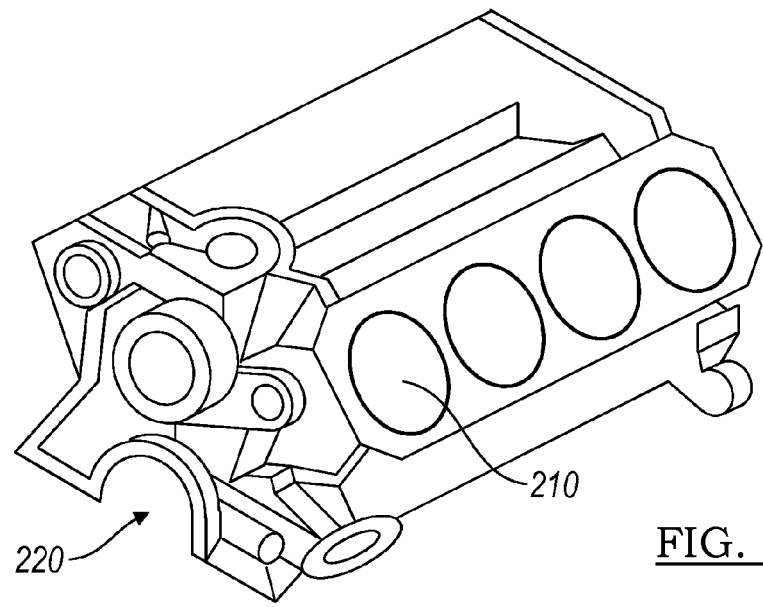
FIG. 2A depicts a non-limiting example of a cylinder bore that can be treated via the method referenced in FIG. 1.
Figure 2B:
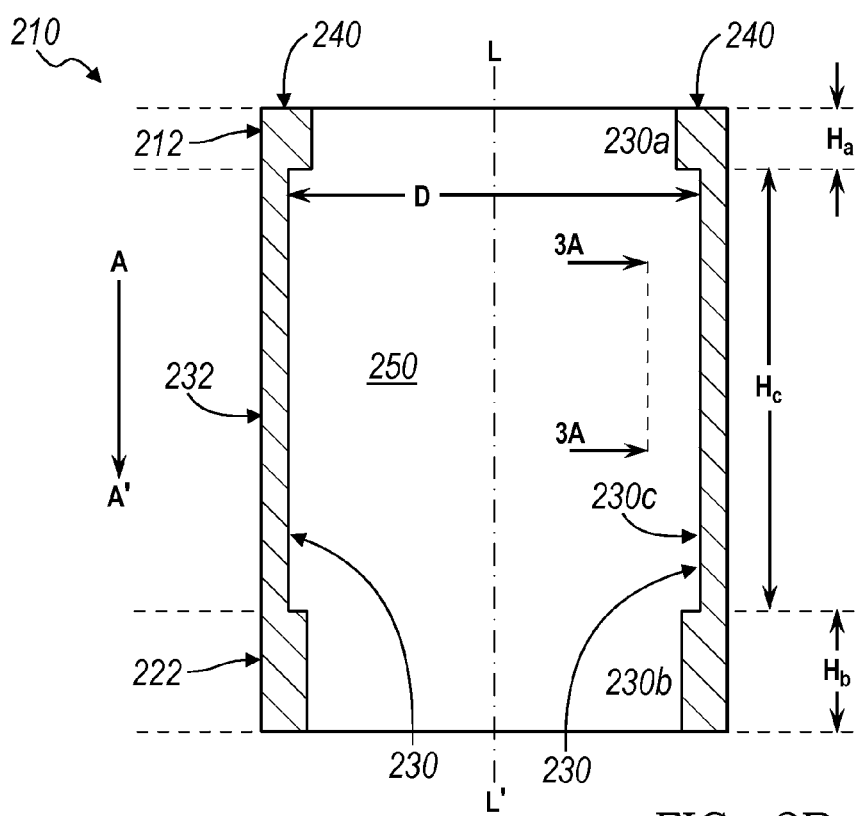
FIG. 2B is a cross-sectional view of the cylinder bore referenced in FIG. 2A.

As depicted in FIGS. 2A and 2B, an engine block 220 of an internal combustion engine (not shown) has one or more cylinder bores 210. The cylinder bores 210 may be formed from and defined by a cylindrical wall of metal material including steel, iron and aluminum. In certain instances, cylinder bores 210 formed from and defined by relatively light weight metals such as aluminum may be preferred over their steel or iron counterparts to reduce the engine size and/or weight and improving engine power output and fuel economy.

When aluminum is used to construct such engine blocks, certain processes are known to enhance strength and wear resistance of the aluminum engine bores. One method is to employ cylinder liners inside and next to the cylinder bores.

An alternative method is to apply metallic coatings onto an interior surface of the aluminum cylinder bores which may essentially function as a cylinder liner.

Internal cylindrical surfaces of the engine bores where an engine piston travels are treated to provide surface roughness to facilitate bonding to a later applied metallic coating. Various surface roughening techniques have been used in the art, but have been met with limitations. One or more embodiments of the present invention, as will be detailed herein below, alleviate this existing roughening problem.

In one aspect, and as depicted in FIGS. 1, 2B and 3A-3E, a method 100 includes, at step 102, selective roughening an internal surface 230 of the cylinder bore 210 to create rectangular-tooth cuts 314 on the internal surface. In certain instances, and as indicated at steps 102 and 104, a selected portion of the internal surface 230 may be machined to form a recess and square grooves. The method 100 further includes, at step 104, wiping the rectangular-tooth cuts 314 to form wiped-tooth cuts 324. The method 100 may further include, at step 108, cleaning the internal surface 230 after the cutting and wiping in preparation for coating generally indicated at step 110. In certain other instances, the wiping is carried out using the tool used to cut the recess, but run with the spindle reverse over the same tool-path used in recess cutting, with a small increase such as 5 to 15 microns in programmed radius.

Figure 3A:
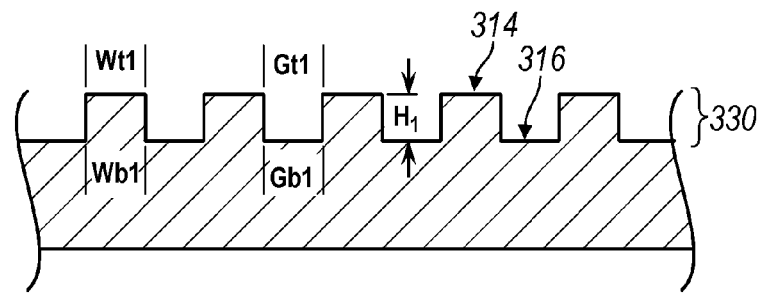
FIG. 3A is an enlarged view of a portion of an internal surface of the cylinder bore referenced in FIG. 2A and showing teeth formed on the internal surface.
Figure 3B:
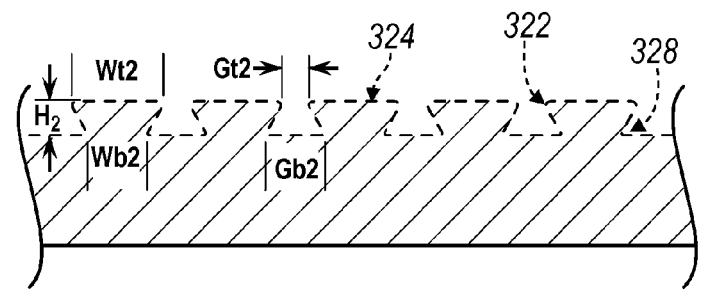
FIG. 3B is an enlarged view of a wiped surface portion of a cylinder bore.
Figure 3C:
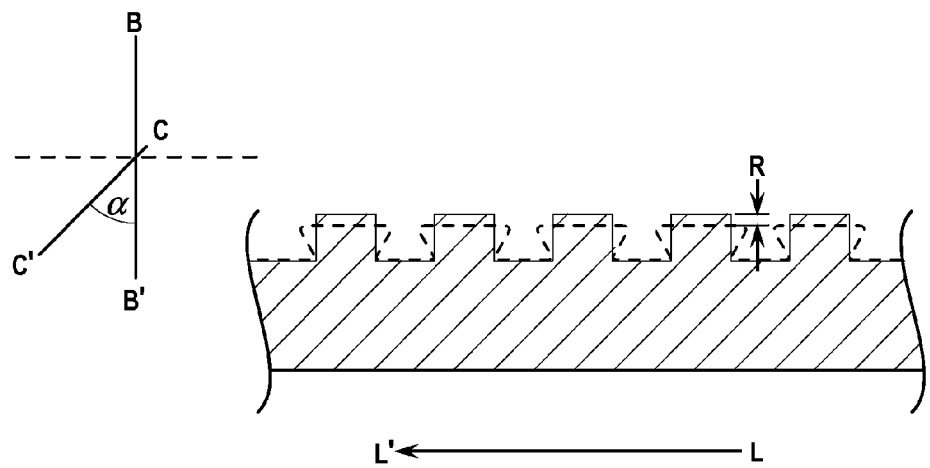
FIG. 3C depicts an overlaid view of the figures referenced in FIGS. 3A and 3B.
Figure 3D:
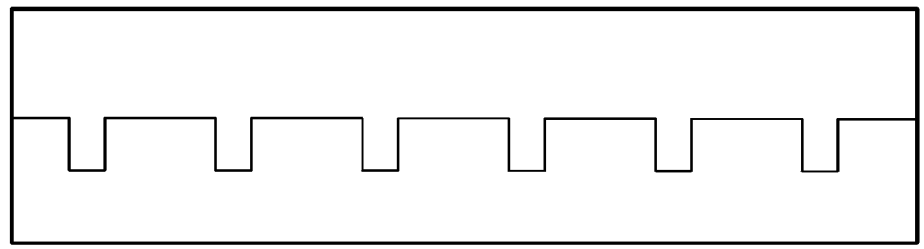
FIG. 3D is another cross-sectional view of the teeth referenced in FIG. 3A.

Referring back to FIGS. 3A and 3D, the tooth 314 may have a top width Wt1, a bottom width Wb1, a height H1, a top gap G0 and a bottom gap Gb1. The top gap Gt1 and the bottom gap Gb1 define the extent of separation between two adjacent teeth. After wiping, and as depicted in FIG. 3B, the teeth 324 each have a top width Wt2, a bottom width Wb2, a height H2, a top gap Gt2 and a bottom gap Gb2. The top gap Gt2 and the bottom gap Gb2 define the extent of separation between two adjacent teeth. The height H2 may be smaller in value than H1.

Figure 3E:
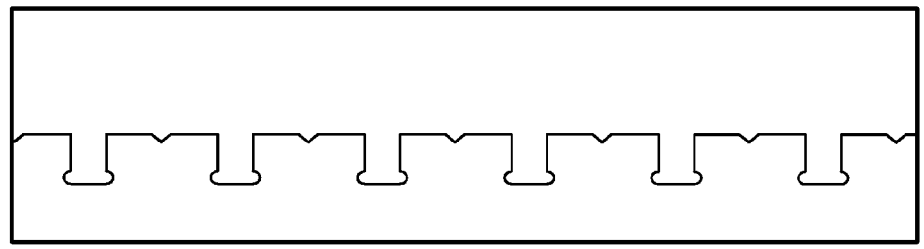
FIG. 3E is another cross-sectional view of the teeth referenced in FIG. 3B.

To create the teeth dimensions as illustratively depicted in FIGS. 3B and 3E, the wiping may be carried out via sliding a rigid body with force imparted in an angular direction with an angle that is greater than zero and less than 90 degrees relative to a radial direction B-B' along which the teeth 314, 324 extend. Without wanting to be limited to any particular theory, it is believed that with the force characterized by the direction α, the teeth 314 deform into a shape more like the one depicted in the teeth 324, and not in the shape depicted in FIG. 5C. In certain instances, the rigid body may be a roller sliding down in the axial direction with a tangential speed.

Referring back to FIGS. 3B and 3E, the teeth 324 may be provided with a "mushroom" type of cap portion such that the teeth 324 have a relatively wider top and a relatively narrower waist or middle portion.

Referring back to FIG. 2B which depicts a cross-sectional view of the cylinder bore 210. The cylinder bore 210 includes a longitudinal axis L-L' and a cylinder wall 240 extending in the longitudinal axis L-L'. The cylinder wall 240 defines a cavity 250 into which an engine piston (not shown) can be received. The cylinder wall 240 includes first and second end portions 212, 222 and a middle portion 232 positioned between the first and second end portions 212, 222. The middle portion 232 has a greater surface roughness relative to at least one of the first and second end portions 212, 222. The surface roughness of the middle portion 232 may be greater than the surface roughness of both of the first and second end portions 212, 222. Surface portions 230a and 230b of the internal surface 230 corresponding to the first and second cylindrical end portions 212, 222 may be not subjected to any surface roughening at all; or when treated, they are less roughened relative to surface portion 230c of the internal surface 230 corresponding to the middle cylindrical portion 232. In this connection, the internal surface 230 of the cylindrical bore 210 is said to have been selected surface treated.

Surface roughness may be determined by manual inspection, including visual examination and touch-and-feel. Generally, a surface with no or less imparted roughening is relatively smoother. A non-limiting example of the method for measuring surface roughness is using a stylus-type surface profilometer. Representative models include the Talysurf PGI 420 (by Taylor Hobson in UK), the Hommel T1000 (by Jenoptik in Germany), and the Mitutoyo Surftest SJ201-P (Mitutoyo in Japan).

Figure 1:
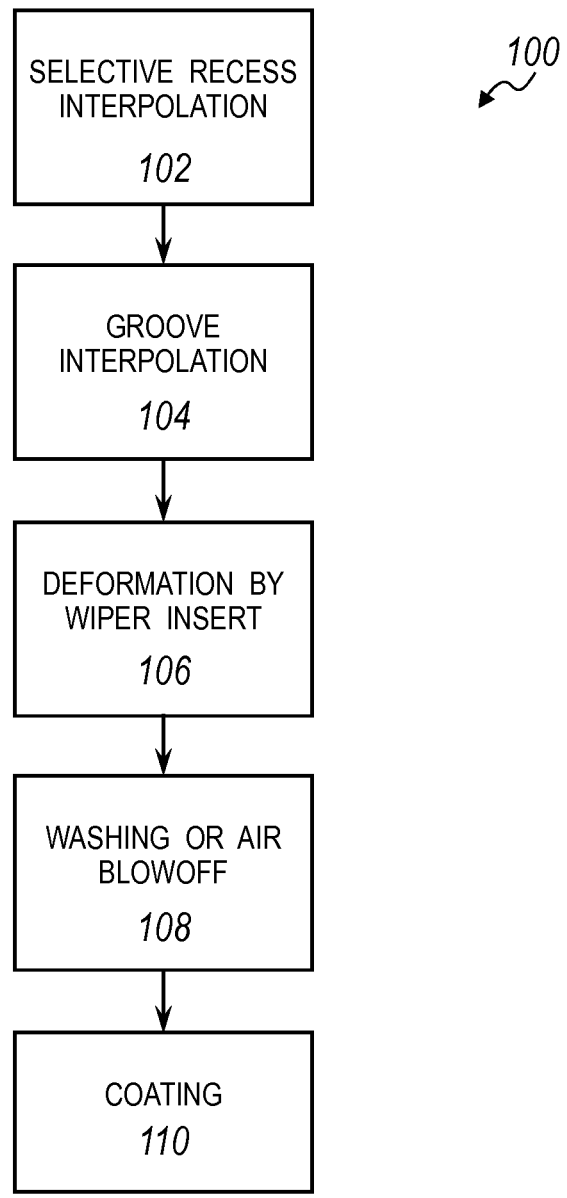
FIG. 1 depicts a flow chart for treating the surface of a cylinder bore according to one or more embodiments.

As indicated at step 102 of FIG. 1 and FIG. 2B, the selective roughening may be imparted onto the surface portion 230c via interpolated machining. A tool blade (not shown) with a rectangular, and particularly a square, tooth profile is fed through the cavity 250 in the direction A-A' shown. The tool blade cuts a rectangular groove profile as generally depicted at 330. The rectangular groove profile 330 includes a number of teeth 314 alternating with a number of grooves 316. The total number and dimensions of the teeth 314 and the grooves 316 may be varied to deliver a desirable level of adhesion. For instance, increasing the total number of teeth 314 may lead to greater adhesion.

In this connection, the tool blade may interpolate, meaning that the tool blade rotates and moves simultaneously in a circular path around the surface portion 230c moving down in the direction of A-A'. This permits machining of grooves in any bore with a diameter larger than the tool. Interpolation makes it possible to cut bores of different diameters with the same tool blade.

Mechanical roughening processes based on finish boring requires that the tool is fed in at the top of the bore, with machining carried all the way through the bottom of the bore, then the bore is cleared prior to the tool being retracted to avoid damage to the cutting teeth. The teeth on these tools are not the same so no one tooth can make the profile, in fact, they cut in a specific order and create a proper profile must advance a precise distance axially for every revolution. If the cutting tool is withdrawn without clearing the part, the last threads are not properly formed, and the teeth on the tool will eventually break. For some of these conventional cutting processes, the cutting tool may need to travel an appreciable distance such as 10 to 15 mm below the bottom of the bore for clearance to avoid breaking the tool. For at least these reasons, these conventional processes cannot interpolate, or one would end up with a bunch of parallel grooves without undercut, until the tool broke.

In the interpolation method according to one or more embodiments of the present invention, each tooth cuts the full profile in successive revolutions while moving in a circular path around the bore without axial motion. So one can start and stop at any point in the bore, and one does not need to cut from top to bottom to feed in and retract the tool. Interpolation enables selective area capability because it does not necessarily require axial motion and may alleviate clearance issues associated with certain conventional cutting methods. The interpolated method can be independent of diameter of the bore and makes creating a grooved pocket more flexible and less complex than with certain conventional bore tooling.

For conventional boring or honing, the tooling is specific for the bore diameter. So if one makes two engine variants with two bore diameters, one needs separate tools for each, which increases tooling inventory and error proofing costs. One set of tools for all bores is advantageous as it reduces tool cost and greatly simplifies tool management at the plant.

In this connection also, a fixed diameter boring-based cutting tool will not be able to accomplish the selective cutting. This is because the fixed diameter tool would have to also cut at least the end portion 212 prior to reaching the middle portion 232. As a result, there will be no selective roughening to the middle portion 232 while leaving the end portion 212 not cut or roughened.

After the selective cutting, the surface portion 230c may be subjected to wiping, generally indicated at step 106 of FIG. 1. In wiping, a blunt blade may be drawn over the surface and does not cut, such that angular force with direction generally shown at C-C' is applied to the outer surfaces of the teeth 314. The angular direction C-C' is positioned relative to the direction B-B' with an angle α, which is greater than zero and smaller than 90 degrees. As a result, the teeth 314 are formed to be wiped teeth 314 with undercuts 318 and overhangs 322. The undercuts 318 and the overhangs 322 together define regions to which a later applied coating may adhere to the surface portion 320c.

The wiping process may be distinguished from burnishing. Burnishing may be used to create a smooth, polished surface and is typically done with a roller type device. The rolling roller crushes the top surface, deforming the surface layer to a final shape. Burnishing may result in the formation of smooth surfaces, which are not particularly helpful for improving adhesion performance relative to a coating composition. In contrast, the wiper insert does not roll and may impart some deformation by crushing the tops of the teeth, but it may also pull material across the finished surface, much like a snow plow, and scores the very top layer of the surface. This is a very distinctive difference from burnishing and is important because it provides a much better surface finish for adhesion of high velocity molten particles from the thermal spray process.

In one or more embodiments, the present invention is advantageous in that the following process parameters can all be reduced: consumption of the coating material due to selective surface area to be coated, coating machining time, and tooling cost. In addition, and regarding overspray cleaning, since the spray gun does not spray below the bottom of the bore, there is relatively less to mask and clean in the crankcase.

Referring back to FIG. 2B, selective roughening is advantageous at least in that the un-roughened or less roughened portions 230a and 230b may serve as a coating overspray shield and collector such that coating overspray out to the surrounding environment may be substantially reduced, for which the waste on the coating material and the cleaning thereafter can each be a very costly event.

After the selective cutting at step 102 and the wiping at step 104, the cylinder bore 210 may be cleaned in preparation for subsequent coating applications. The cleaning at step 108 may be carried out via any suitable methods, such as brushing, water spraying and/or forced air blowing. The goal for the cleaning is to remove metal debris from the cutting and wiping, as the metal debris may become the potential source for adhesion failure.

Longitudinal length "Hc" of the middle cylindrical portion 232 can be of any suitable value and in general, is greater than the piston ring travel in the cylinder bore 210.

Longitudinal length "Ha" of the first cylindrical end portion 212 can be of any suitable value. In certain instances, a length ratio of Ha to Hc is no greater than 1:5, 1:10, or 1:15, and no less than 1:50, 1:40, or 1:30.

Longitudinal length "Hb" of the second cylindrical end portion 222 can be of any suitable value. In certain instances, a length ratio of Hb to Hc is no greater than 1:5, 1:10, or 1:15, and no less than 1:50, 1:40, or 1:30.

Figure 4A:
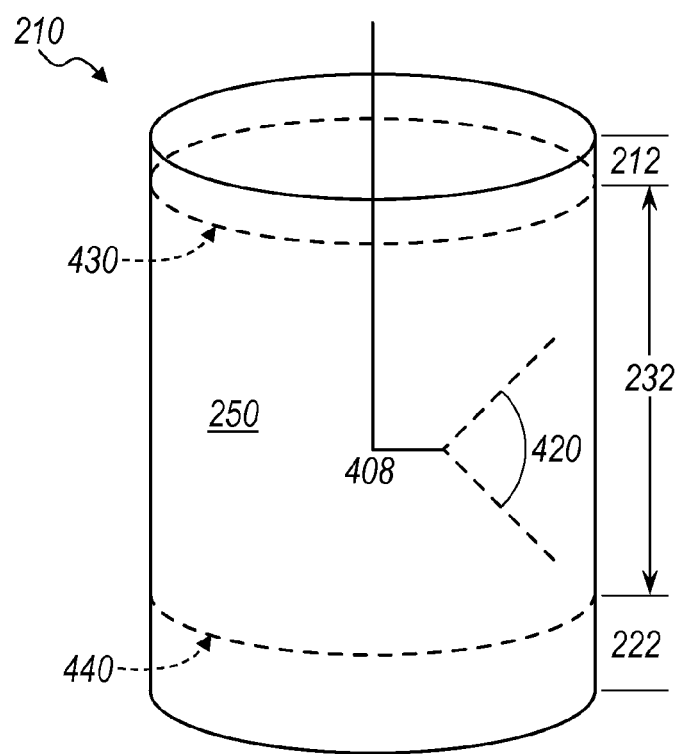
FIG. 4A depicts an isolated, perspective view of the cylinder bore referenced in FIG. 2A.

After the cleaning at step 106, the cylinder bore 210 may be ready for subsequent coating generally indicated at step 110 of FIG. 1. As further depicted in FIG. 4A, a spray gun 408 may be received within the cavity 250 of the cylinder bore 210, wherein coating material exits the spray gun 408 in the form of a spray 420. The spray gun 408 may start the spray coating at or near a dividing line 430 separating the portions 212 and 232 and may end the spray coating at or near a dividing line 440 separating the portions 222 and 232. In this connection, and as mentioned herein elsewhere, the portions 212 and 222 may help shield and collect the overspray as a result of the spraying process targeted to the middle portion 232.

A non-limiting example of the spray gun 408 is a rotating and axially reciprocating torch. In this connection, the torch reciprocates, or moves up and down, in the longitudinal axis of the cylinder bore 210.

Thermal spraying may be used to apply a coating on the surface portion 230c of the middle portion 232 of the cylinder bore 210 using a thermal spray gun configured to spray molten coating material. In general, the coating is deposited by moving the thermal spray gun in the axial direction inside the cylinder bore while rotating the thermal spray gun. After the thermally sprayed coating is formed, the surface of the coating may be finished by honing or other machining process.

Figure 4B:
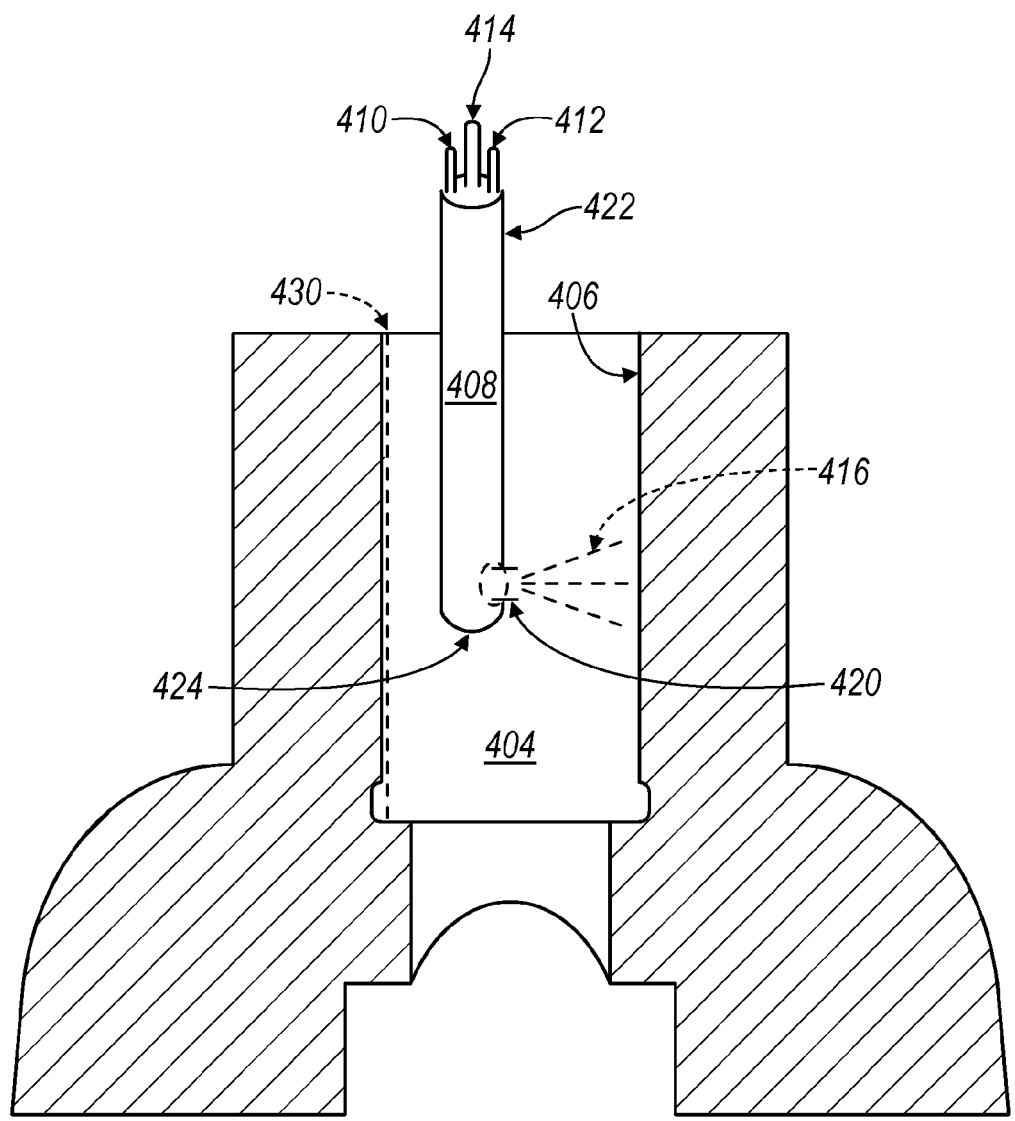
FIG. 4B depicts a cross-sectional view of a spray gun received within the cylinder bore as referenced in FIG. 4A.

Thermal spraying can be carried out in any suitable manner. U.S. Pat. No. 5,622,753 discloses a representative method of thermal spraying. As illustratively depicted in FIG. 4B, two wires 410 and 412 are fed down a rotatable and reciprocating shaft 408 and directed to have their tips 420 closely spaced to permit creating an arc through which a gas passes. Electrical current may be passed through the wires 410 and 412 so as to create the arc across the tips 420 while pressurized gas may be directed between the tips 420 to spray molten droplets from the coating material inlet 414. The thermal spray gun generally shown at 422 includes a gun head 424, creating a spray 416 of molten metal droplets. A plasma creating gas (such as air, nitrogen or argon) possibly mixed with some hydrogen, is directed through the arc to be heated to a temperature that creates a stream of hot ionized electrically conductive gas. The molten droplets are projected as a spray 416 onto the surface 406 of the cylinder bore 404.

The shaft 408 of the thermal spray gun 422 supports and moves the gun head 424 for coating the interior surfaces 406 of the cylinder bore 404. The shaft 408 supports the gun head 424 at one end and includes channels (not shown) at the other end for supplying wires and gases to the gun head 424. The shaft 408 may be supported by a rotary drive such that the shaft 408 rotates about its own axis or an axis parallel thereto. The rotary drive may, in turn, be supported on a linear traverse mechanism or a slide that moves the rotary drive up and down. Thus, the gun head 424 moves up and down, while being rotatable, within the cylinder bore 404. The thermal spray gun 422 may move at a uniform speed to coat the interior surface 406, sometimes with several passes to build a desirable thickness of the coat.

The to-be-coated articles can be any objects suitable to be coated by a spray gun, for instance, cylindrical engine bores. The articles may include automotive components or non-automotive components. Non-limiting examples of the articles include precision bores in engines, pumps and compressors. In certain particular instances, the articles include automotive engine bores.

The teeth dimensions including the width of W, the height of H and the gap of G may be obtained by measurements with the use of a coordinate measurement machine (CMM).

CMMs may be commercially available, for instance, available from Zeiss, Brown and Sharp. The CMM equipment includes one or more movable arms, each equipped with one or more position probes. During measurement, the position probes detect the position of each of the targeted spots on the sprayed coating and a data set in the form of position values on the x, y and z axis of each targeted spot is collected, stored and subsequently processed for comparison.

Surface profile and hence surface roughness may further be obtained, optionally with the use of CMM, via the employment of optical profilometry techniques, wherein measurements can be carried out by a variety of techniques such as optical triangulation, interferential techniques or others. These techniques may make it possible to determine the surface profile of the parts without contact. Optical profilometry may be used to supplement the CMM techniques, particularly in areas where the CMM probes may not readily reach. These areas may include sharp turns and hidden corners on a given spray coating.

Having generally described several embodiments of this invention, a further understanding can be obtained by reference to certain specific examples which are provided herein for purposes of illustration only and are not intended to be limiting unless otherwise specified.

EXAMPLE

Example 1

The Wiping Force Directions

In this example, and as depicted in FIGS. 5A to 5E, the following sample parameters are used: teeth height (H)=200 µm and teeth gap (G)=100 µm; 2-D plane-strain without failure criteria; 25 µm arc from "rib" to the base to avoid stress concentration; conversion from 2-D to 3-D model using roller pressing down; and 3-D model using roller sliding in.

These dimensions, including the tooth width of W, the tooth height of H and tooth gap of G, may be modeled and optimized via the use of Finite Element Analysis (FEA). FEA may be carried out via the use of ABAQUS explicit, a standard general purpose finite element code, commonly used codes include ABAQUS, now marketed by Dassault Systemes from France, NASTRAN, etc. Any general purpose finite element code suitable for elastic-plastic large strain analysis would be suitable. A non-limiting example of the FEA method may be found in "Metal Forming and the Finite-Element Method" by Shiro Kobayashi, Soo-Ik Oh and Taylan Altan, Oxford University Press, 1989.

Figure 5A:
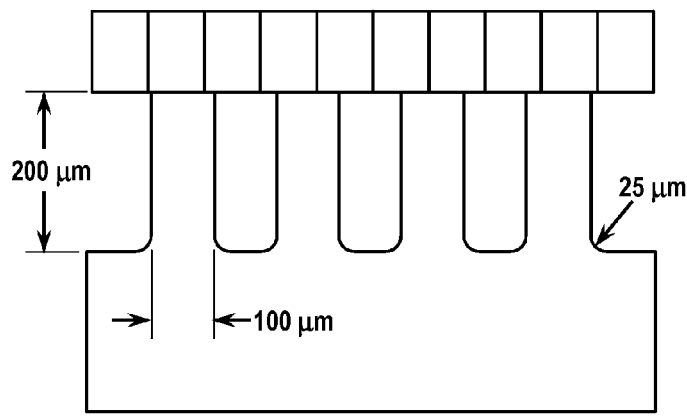
FIGS. 5A to 5E depict views of teeth deformation upon an downward force on the teeth.
Figure 5B:
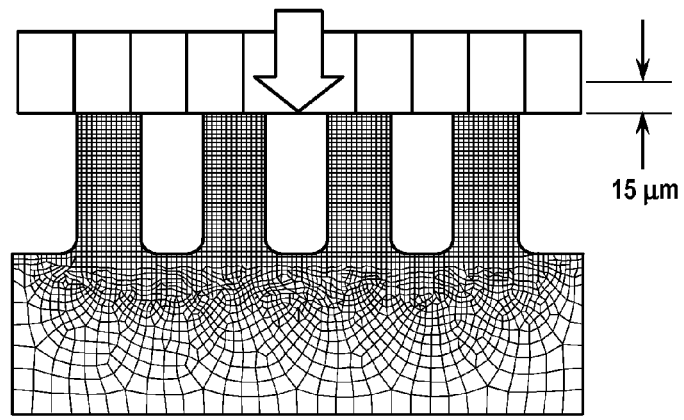
Figure 5C:
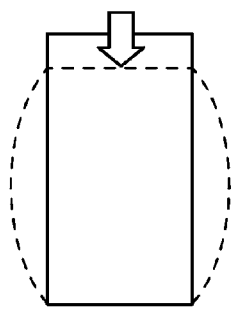
Figure 5D:
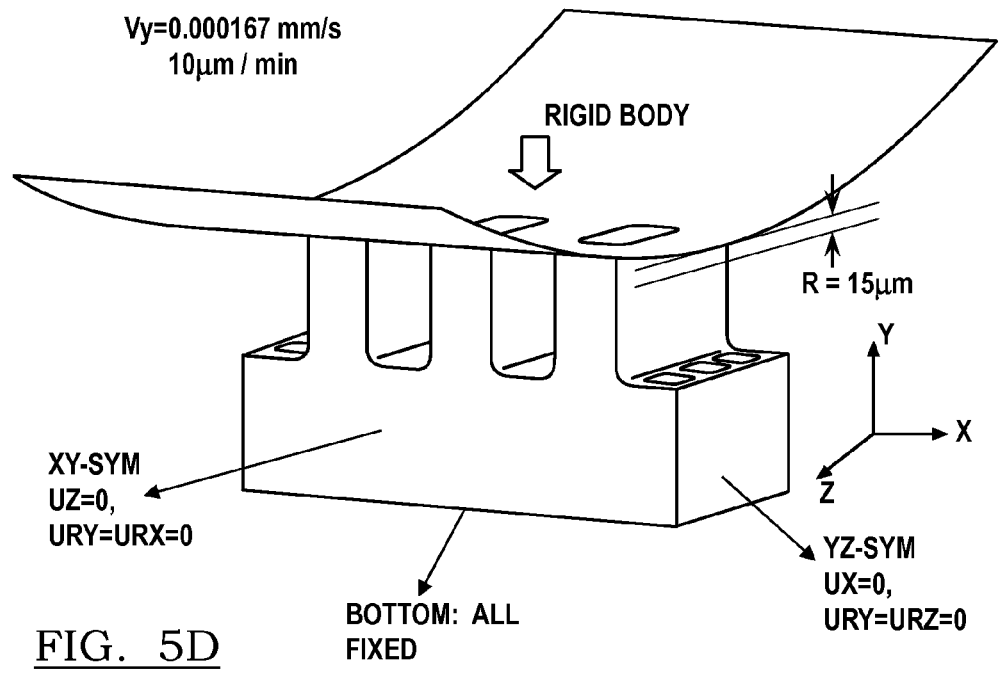
Figure 5E:
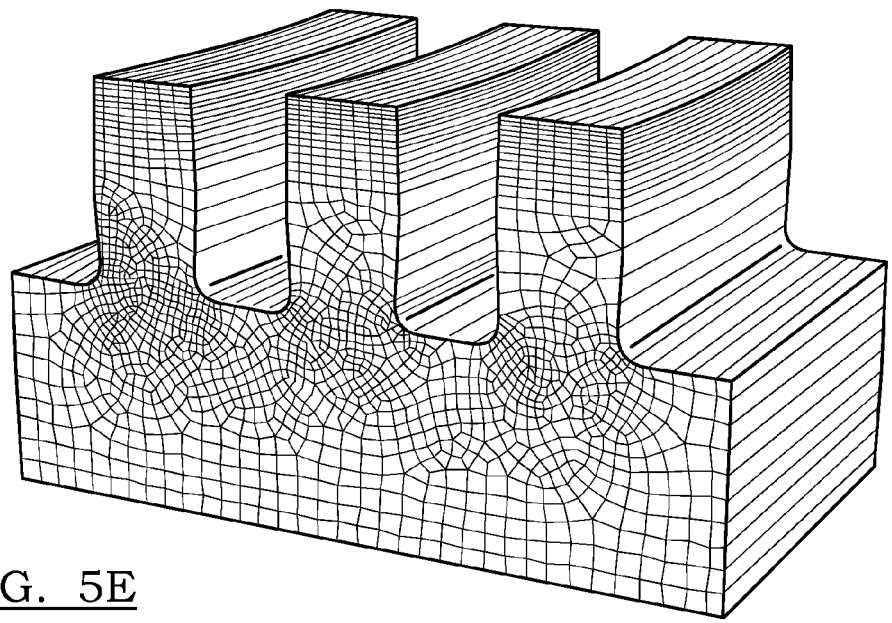

As can be seen from FIG. 5B relative to FIG. 5A, upon the application of force with direction shown in arrow "B", average height of the teeth is reduced by about 15 µm. Because of the straight down force imparted onto the teeth, FIG. 5C depicts a typical form of deformation with a bulging waist, unlike the shape depicted in FIG. 3B. FIGS. 5D and 5E depict the 3-D views of FIG. 5B and FIG. 5C, respectively, showing a rigid body imparting a force in arrow shown.

Figure 6A:
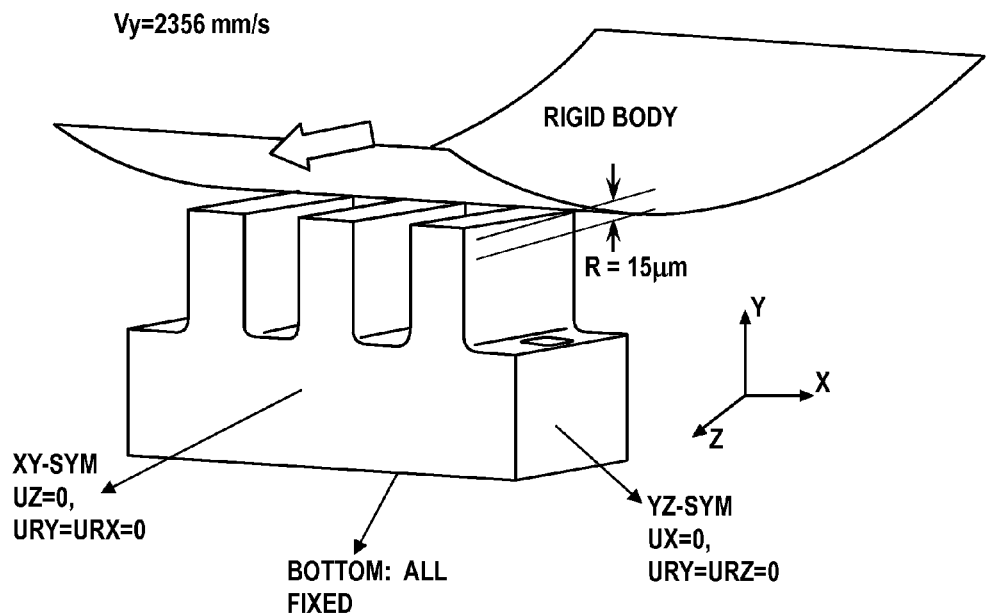
FIGS. 6A to 6C depict views of teeth deformation upon an angular force on the teeth.
Figure 6B:
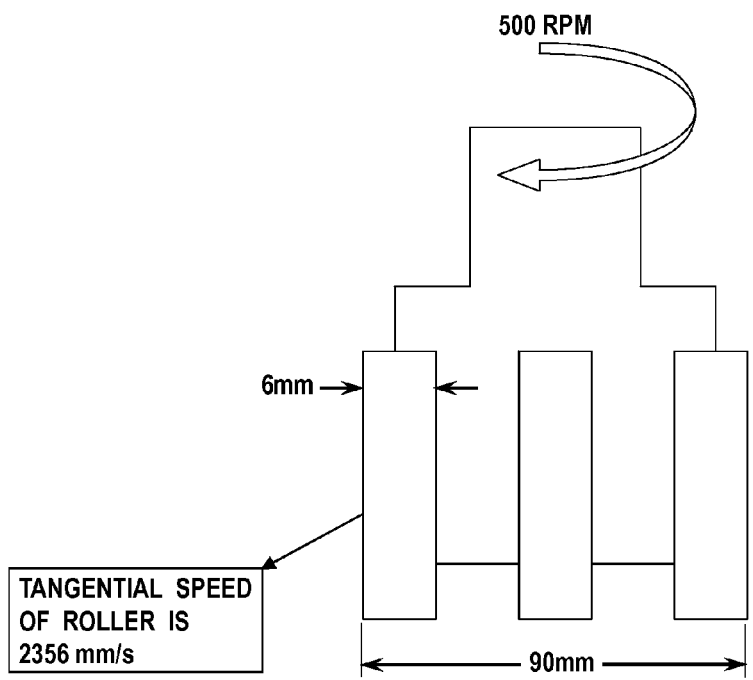
Figure 6C:
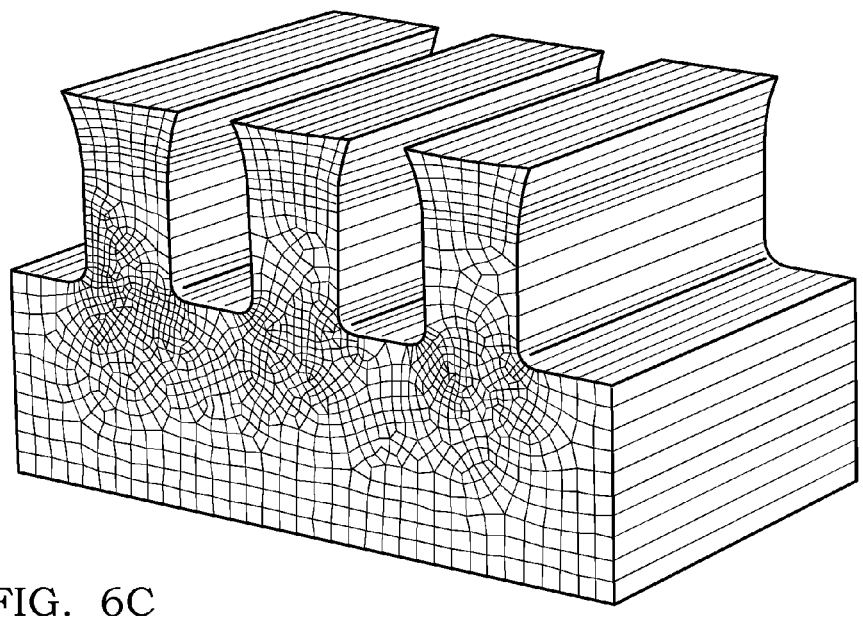

FIGS. 6A to 6C illustratively teeth deformation upon the application of a force in a direction with an angle, such as in the direction of Z. In this setting, the rigid body rotates and concurrently travels down in the axial direction, resulting in a collective tangential speed. FIG. 6C shows that as a result of the application of the force in the Z direction, the teeth have a deformation shape similar to that shown in FIG. 3B.

Example 2

Teeth Aspect Ratio and Deformation

In this example, 18 sample panels are used, each including 3 consecutively aligned teeth, with tooth width of W, tooth height of H, teeth gap of G, and a reduction in height of R. Illustration for W, H and G is depicted in FIG. 3A. Groups 1 to 3 have the same width of 150 µm, the same gap of 300 µm, the same reduction in height of 30 µm upon deformation, and variable values in height of 120 µm, 160 µm and 200 µm. Groups 4 to 6 have the same width of 190 µm, the same gap of 380 µm, the same reduction in height of 30 µm upon deformation, and variable values in height of 120 µm, 160 µm and 200 µm. Groups 7 to 9 have the same width of 230 µm, the same gap of 460 µm, the same reduction in height of 30 µm upon deformation, and variable values in height of 120 µm, 160 µm and 200 µm. Groups 10 to 12 have the same width of 150 µm, the same gap of 300 µm, the same reduction in height of 60 µm upon deformation, and variable values in height of 120 µm, 160 µm and 200 µm. Groups 13 to 15 have the same width of 190 µm, the same gap of 380 µm, the same reduction in height of 60 µm upon deformation, and variable values in height of 120 µm, 160 µm and 200 µm. Groups 16 to 18 have the same width of 230 µm, the same gap of 460 µm, the same reduction in height of 60 µm upon deformation, and variable values in height of 120 µm, 160 µm and 200 µm. These parameters are listed in Table 1.

TABLE 1

| Group | W (µm) | H (µm) | G (µm) | R (µm) |
| --- | --- | --- | --- | --- |
| 1 | 150 | 120 | 300 | 30 |
| 2 | 150 | 160 | 300 | 30 |
| 3 | 150 | 200 | 300 | 30 |
| 4 | 190 | 120 | 380 | 30 |
| 5 | 190 | 160 | 380 | 30 |
| 6 | 190 | 200 | 380 | 30 |
| 7 | 230 | 120 | 460 | 30 |
| 8 | 230 | 160 | 460 | 30 |
| 9 | 230 | 200 | 460 | 30 |
| 10 | 150 | 120 | 300 | 60 |
| 11 | 150 | 160 | 300 | 60 |
| 12 | 150 | 200 | 300 | 60 |
| 13 | 190 | 120 | 380 | 60 |
| 14 | 190 | 160 | 380 | 60 |
| 15 | 190 | 200 | 380 | 60 |
| 16 | 230 | 120 | 460 | 60 |
| 17 | 230 | 160 | 460 | 60 |
| 18 | 230 | 200 | 460 | 60 |

As depicted in FIGS. 3A and 3B, the tooth has a top width of Wt, a bottom width of Wb, a top gap of Gt with which to space apart from the next adjacent tooth, and a bottom gap of Gb. Changes in value of Wt and Gt for the groups 1 to 18 are listed in Table 2. Changes in value of Wb and Gb for the groups 1 to 18 are listed in Table 3.

TABLE 2

| | Before Wiping | | | After Wiping | | |
| --- | --- | --- | --- | --- | --- | --- |
| Group | Wt1 (µm) | Gt1 (µm) | Total (µm) | Wt2 (µm) | Gt2 (µm) | Total (µm) |
| 1 | 150 | 300 | 450 | 215 | 222 | 437 |
| 2 | 150 | 300 | 450 | 208 | 228 | 435 |
| 3 | 150 | 300 | 450 | 205 | 231 | 436 |
| 4 | 190 | 380 | 570 | 259 | 295 | 554 |
| 5 | 190 | 380 | 570 | 252 | 302 | 554 |
| 6 | 190 | 380 | 570 | 248 | 306 | 554 |
| 7 | 230 | 460 | 690 | 306 | 363 | 669 |

TABLE 2-continued

| | Before Wiping | | | After Wiping | | |
|---|---|---|---|---|---|---|
| Group | Wt1 (μm) | Gt1 (μm) | Total (μm) | Wt2 (μm) | Gt2 (μm) | Total (μm) |
| 8 | 230 | 460 | 690 | 297 | 372 | 668 |
| 9 | 230 | 460 | 690 | 292 | 379 | 671 |
| 10 | 150 | 300 | 450 | 294 | 155 | 449 |
| 11 | 150 | 300 | 450 | 283 | 167 | 451 |
| 12 | 150 | 300 | 450 | 271 | 166 | 437 |
| 13 | 190 | 380 | 570 | 356 | 211 | 568 |
| 14 | 190 | 380 | 570 | 342 | 227 | 569 |
| 15 | 190 | 380 | 570 | 326 | 228 | 554 |
| 16 | 230 | 460 | 690 | 392 | 291 | 682 |
| 17 | 230 | 460 | 690 | 377 | 304 | 682 |
| 18 | 230 | 460 | 690 | 366 | 312 | 678 |

TABLE 3

| | Before Wiping | | | After Wiping | | |
|---|---|---|---|---|---|---|
| Group | Wb1 (μm) | Gb1 (μm) | Total (μm) | Wb2 (μm) | Gb2 (μm) | Total (μm) |
| 1 | 150 | 300 | 450 | 159 | 279 | 437 |
| 2 | 150 | 300 | 450 | 148 | 288 | 436 |
| 3 | 150 | 300 | 450 | 148 | 288 | 436 |
| 4 | 190 | 380 | 570 | 207 | 348 | 554 |
| 5 | 190 | 380 | 570 | 193 | 360 | 553 |
| 6 | 190 | 380 | 570 | 188 | 366 | 553 |
| 7 | 230 | 460 | 690 | 252 | 417 | 669 |
| 8 | 230 | 460 | 690 | 238 | 432 | 670 |
| 9 | 230 | 460 | 690 | 228 | 441 | 669 |
| 10 | 150 | 300 | 450 | 195 | 239 | 434 |
| 11 | 150 | 300 | 450 | 156 | 293 | 448 |
| 12 | 150 | 300 | 450 | 148 | 289 | 437 |
| 13 | 190 | 380 | 570 | 252 | 319 | 571 |
| 14 | 190 | 380 | 570 | 208 | 362 | 570 |
| 15 | 190 | 380 | 570 | 191 | 361 | 553 |
| 16 | 230 | 460 | 690 | 191 | 413 | 704 |
| 17 | 230 | 460 | 690 | 253 | 423 | 676 |
| 18 | 230 | 460 | 690 | 238 | 434 | 672 |

Example 3

Adhesion Testing on the Selective Area Coating

Figure 7:
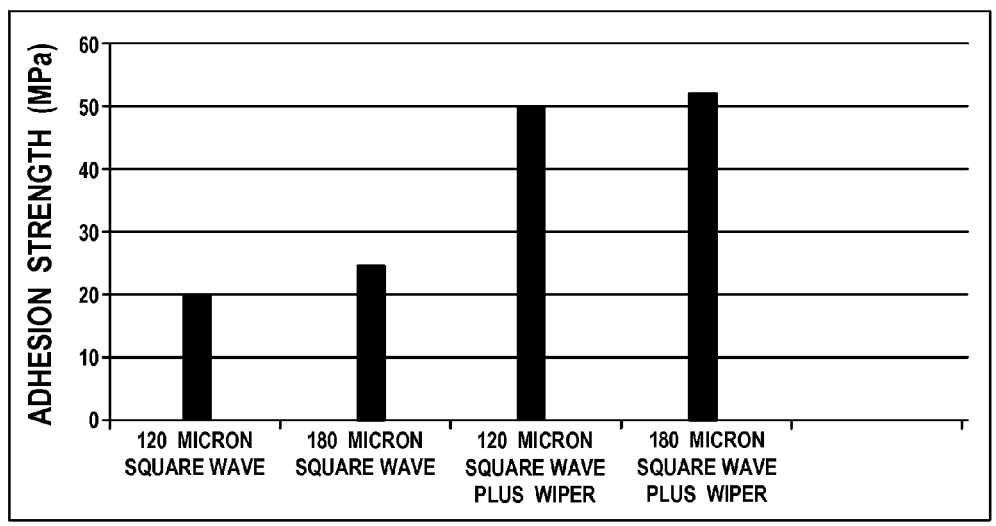
FIG. 7 depicts coating adhesion values with or without the forming step as referenced in the Example.

FIG. 7 depicts coating adhesion strength compared across a sample bore with square cuts only and a sample bore with the square cuts followed by wiping. These sample bores all have a first end portion axial length of 5 mm, a combined axial length of 100 mm including the first end portion and middle portion, and a diameter of 82 mm of the middle portion. Each group includes 4 bores with parameters listed in Table 4.

TABLE 4

| H (mm) | W (mm) | G (mm) | R (mm) |
|---|---|---|---|
| 120 | 200 | 300 | 30 |
| 180 | 100 | 400 | 30 |
| 180 | 200 | 300 | 30 |
| 120 | 100 | 400 | 30 |
| 180 | 200 | 300 | 0 |
| 120 | 100 | 400 | 0 |
| 120 | 200 | 300 | 0 |
| 180 | 100 | 400 | 0 |

As can be seen from the adhesive strength value reported in FIG. 7, square cutting in combination with wiping together result in much improved adhesion of the coating material onto the bore.

While the best mode for carrying out the invention has been described in detail, those familiar with the art to which this invention relates will recognize various alternative designs and embodiments for practicing the invention as defined by the following claims.

What is claimed:

1. A cylinder bore having a longitudinal axis and a cylindrical wall extending along the longitudinal axis, the cylindrical wall comprising:
    a first end portions having a first diameter; and
    a middle portion axially adjacent to the first end portion, the middle portion having a second diameter greater than the first diameter and a plurality of parallel, alternating teeth and grooves formed therein to provide a surface roughness of the middle portion greater than a surface roughness of the first end portion.

2. The cylinder bore of claim 1, further comprising a second end portion axially adjacent to the middle portion at an end opposite from the first end portion and having a third diameter smaller than the second diameter.

3. The cylinder bore of claim 1, wherein an axial length ratio of the middle portion to the first end portions is of 10:1 to 50:1.

4. The cylinder bore of claim 2, wherein the first end portion has a different axial length than the second end portion.

5. The cylinder bore of claim 2, wherein at least one of the first and second end portions has an axial length that is 2 to 15 percent of a length of the middle portion.

6. The cylinder bore of claim 1, wherein each groove of the plurality of teeth and grooves includes a rectangular cross-section.

7. The cylinder bore of claim 1, wherein each groove of the plurality of teeth and grooves includes a trapezoid cross-section.

8. The cylinder bore of claim 1, wherein the middle portion further comprises a metal coating covering the plurality of teeth and grooves.

9. A cylinder bore having a longitudinal axis and a cylindrical wall extending along the longitudinal axis, the cylindrical wall including first and second end portions having a first diameter and a middle portion positioned between the first and second end portions and having a second diameter greater than the first diameter, the middle portion having a plurality of parallel, alternating teeth and grooves formed therein.

10. The cylinder bore of claim 9, wherein the first end portion has a different axial length relative to the second end portion.

11. A method of forming a cylinder bore having a longitudinal axis and a cylindrical wall extending along the longitudinal axis, the cylindrical wall including first and second end portions and a middle portion positioned between the first and second end portions, the method comprising:
    forming the middle portion to have a diameter greater than a diameter of the first portion and a diameter the second portion and having a plurality of parallel, alternating teeth and grooves formed therein.

12. The method of claim 11, wherein the alternating grooves and teeth are formed with a rectangular cross-section.

13. The method of claim 11, further comprising wiper blading the teeth with an angular force at an angle to the longitudinal axis of the cylinder bore, the angle being greater than zero and smaller than 90 degrees.

14. The method of claim 11, further comprising applying a coating layer to the alternating teeth and grooves of the middle portion.

\* \* \* \* \*